(12) United States Patent
Du et al.

(10) Patent No.: US 11,784,723 B2
(45) Date of Patent: Oct. 10, 2023

(54) METHOD FOR IMPLEMENTING MANY-TO-ONE CONCURRENT TRANSMISSION MEDIUM ACCESS CONTROL (MAC) PROTOCOL FOR UNDERWATER ACOUSTIC NETWORKS

(71) Applicant: Qinghai Normal University, Xining (CN)

(72) Inventors: Xiujuan Du, Xining (CN); Duoliang Han, Xining (CN); Yi Shang, Xining (CN)

(73) Assignee: Qinghai Normal University, Xining (CN)

( * ) Notice: Subject to any disclaimer, the term of this patent is extended or adjusted under 35 U.S.C. 154(b) by 0 days.

(21) Appl. No.: 17/876,778

(22) Filed: Jul. 29, 2022

(65) Prior Publication Data
US 2022/0368432 A1 Nov. 17, 2022

(30) Foreign Application Priority Data
Oct. 27, 2021 (CN) .......................... 202111256104.5

(51) Int. Cl.
*H04B 13/02* (2006.01)
*H04B 13/00* (2006.01)
*H04L 12/755* (2013.01)
*H04B 11/00* (2006.01)
*H04L 45/021* (2022.01)

(52) U.S. Cl.
CPC ............. *H04B 13/02* (2013.01); *H04B 11/00* (2013.01); *H04L 45/021* (2013.01)

(58) Field of Classification Search
CPC ....... H04B 13/02; H04B 11/00; H04L 45/021; Y02D 30/70
See application file for complete search history.

(56) References Cited

FOREIGN PATENT DOCUMENTS

| CN | 107919950 A | 4/2018 |
| CN | 111866982 A | 10/2020 |
| CN | 112398806 A | 2/2021 |
| EP | 2259634 A2 | 12/2010 |

OTHER PUBLICATIONS

Shanwei, Zhou et al., "Design and Development of Medium Access Control Protocol for Data-collection-oriented Underwater Acoustic Sensor Networks", China Academic Journal Electronic Publishing House, 2022, pp. 1-89.

(Continued)

*Primary Examiner* — Daniel L Murphy
*Assistant Examiner* — Amie M Ndure

(57) ABSTRACT

A method for implementing a many-to-one concurrent transmission medium access control (MAC) protocol for underwater acoustic networks, including: initializing a network; setting a timer; initiating, by a receiving node, a control frame to perform handshakes with multiple nodes; exchange ID, level and location of the receiving node and a sending node, and counting the number of nodes that generate a sending notification (SN) message before timeout; and planning, by the receiving node, a receiving scheduling time of data from different nodes according to the number of successful handshake nodes, distance from each sending node to the receiving node, and data packet size; and performing data transmission.

6 Claims, 7 Drawing Sheets

(56) References Cited

OTHER PUBLICATIONS

Liu Songzou et al., "An Enhanced Full-Duplex MAC Protocol for an Underwater Acoustic Network", 2021 International Bhurban Conference on Applied Sciences and Technologies (IBCAST), 2021, pp. 894-898.

Lijuan WangSummary of MAC Protocol of Underwater Acoustic Network Design and Implementation of State-based MAC Protocol for UANs in Real Testbed, Oceans 2018 MTS/IEEE Charleston, 2018, pp. 1-5.

Shangyi et al., "Summary of MAC Protocol of Underwater Acoustic Network", Modern Computer, 2021, pp. 11-16.

Yuan Liu et al., "Collision-free topology discovery protocol for underwater acoustic network", Systems Engineering and Electronics, 2020, vol. 42, No. 7, pp. 1597-1604.

METHOD FOR IMPLEMENTING MANY-TO-ONE CONCURRENT TRANSMISSION MEDIUM ACCESS CONTROL (MAC) PROTOCOL FOR UNDERWATER ACOUSTIC NETWORKS

CROSS-REFERENCE TO RELATED APPLICATIONS

This application claims the benefit of priority from Chinese Patent Application No. 202111256104.5, filed on Oct. 27, 2021. The content of the aforementioned application, including any intervening amendments thereto, is incorporated herein by reference in its entirety.

TECHNICAL FIELD

This application relates to underwater acoustic networks (UWANs), and more specifically to a method for implementing a many-to-one concurrent transmission medium access control (MAC) protocol for underwater acoustic networks.

BACKGROUND

Considering the serious attenuation of electrical and optical signals during the process of underwater communication, underwater acoustic networks mainly adopts underwater acoustic signals for communication. However, the UWAN communication is affected to a certain extent by long delay, limited bandwidth, large energy consumption and high bit error rate of the underwater acoustic channel. In addition, hidden terminal problems, space-time uncertainty, and near-far problem have posed greater challenges to the design of media access control (MAC) protocols for UWANs. At present, the MAC protocol for terrestrial wireless sensor networks (WSNs) is not suitable for the UWAN communication. In view of this, it is extremely important to design a MAC protocol with high network performance according to characteristics of the UWANs.

Many MAC protocols have been recently proposed for UWANs. These MAC protocols can be classified into contention-free MAC protocols, scheduling-based MAC protocols, and hybrid MAC protocols. A slotted floor acquisition multiple access (Slotted-FAMA) protocol has been proposed for UWANs, in which a time slot is introduced, and a carrier sense mechanism and a handshake mechanism are adopted to solve the hidden terminal and data collision problems to a certain extent. However, since the time slot is excessively long, and only one node is allowed to send data after each successful handshake, the channel utilization is not satisfactory. Regarding the reservation-based MAC (R-MAC) protocol, which is based on a channel reservation mechanism, although it has high throughput in a network with burst traffic, it still struggles with large delay and complicated collision avoidance mechanism. Moreover, for a data-collection-oriented underwater acoustic sensor network (DCO-UASN), a cluster-based hybrid MAC protocol has been designed, in which intra-cluster communication and inter-cluster communication are periodically conducted in the cluster to avoid collisions between the sender and receiver. However, the network throughput is low when this hybrid MAC protocol is used for the inter-cluster communication with heavy network load.

SUMMARY

In order to improve the channel utilization and network throughput, the present disclosure provides a method for implementing a concurrent scheduling (CS) medium access control (MAC) protocol for underwater acoustic networks (UWANs).

The technical solutions of the present disclosure are described as follows.

This application provides a method for implementing a many-to-one concurrent transmission medium access control (MAC) protocol for underwater acoustic networks (UWANs), comprising:

(S1) initializing a network;

(S2) setting a timer;

initiating, by a receiving node, a control frame to perform handshakes with multiple nodes: performing information exchange between the receiving node and a sending node, wherein the information exchange comprises exchange of ID, level and location of the receiving node and the sending node; and counting the number of nodes that generate a sending notification (SN) message before timeout; and planning, by the receiving node, a receiving scheduling time of data from different nodes according to the number of successful handshake nodes, a distance from the sending node to the receiving node, and a data packet size; and (S3) transmitting the data according to a planned time.

In an embodiment, the step (S1) comprises:

performing node layering such that a dynamic neighbor table is maintained for each node in the network, wherein the dynamic neighbor table is configured to record ID, level, aging time and location information of a one-hop neighbor node.

In an embodiment, the node layering is performed through steps of:

broadcasting, by a sink node, a hello message to the network;

allowing each node to obtain a corresponding level after receiving the hello message; and configuring the level of each node according to the number of hops from the sink node.

In an embodiment, the step (S2) is performed through steps of:

(S2.1) setting the timer and broadcasting a ready-to-receive (RTR) message; wherein the timer is set to ensure that handshake control frames of all nodes that have data to be sent within a transmission range of the receiving node are received within a Timer period; and counting the number of nodes that sent the control frame to itself before timeout;

(S2.2) receiving, by a neighbor node, the RTR message from the receiving node;

determining a relationship between a level $L\_s$ of the neighbor node and a level $L\_r$ of the receiving node; and determining whether an interference signal is detected;

(S2.3) receiving, by the receiving node, SN frames from different sending nodes in a handshake process;

allocating, by the receiving node, a receiving scheduling time respectively to each sending node that has data to send to the receiving node according to the number of sending nodes, a distance between the receiving node and each sending node, and a length of data of each sending node; and encapsulating the receiving scheduling time into an ORDER frame followed by broadcasting such that sending nodes that have completed the handshake process send data in an orderly manner.

In an embodiment, the Timer period is calculated as:

Timer=$2T_{pd\_max}+2\theta+$Rand( );

wherein Rand( ) represents a random time interval between 0-1; $\theta$ represents a transmission delay of the control frame; and $T_{pd\_max}$ represents a maximum propagation delay taken by a message from a sender to one of its neighbor nodes within a transmission range, calculated as follows:

$$T_{pd\_max}=d_{max}/v;$$

wherein $d_{max}$ represents a maximum transmission range of the receiving node; and v is an underwater propagation speed of acoustic waves.

In an embodiment, in step (S2.2), if L_r≥L_s, the neighbor node discards the RTR message and keeps silent; otherwise, the neighbor node performs channel sensing.

In an embodiment, in step (S2.2), if no interference signal is detected, the SN message containing ID of a destination node, an ID, level, and location of the node is immediately sent to the receiving node;

otherwise, the transmission of the SN message is delayed.

In an embodiment, in step (S3), after the ORDER frame is broadcasted, the receiving node enters a data receiving stage; and after receiving the ORDER frame, each sending node calculates a time point for data sending according to the receiving scheduling time allocated by the receiving node to the receiving node, and sends corresponding data to the receiving node at a calculated time point, and then waits for an acknowledgement (ACK) confirmation frame, so as to enable concurrent transmission of multiple sending nodes to one receiving node.

In an embodiment, in step (S3), it is assumed that the receiving node has H neighbor nodes, H=K+Q;

wherein K represents the number of neighbor nodes having a level less than the level of the receiving node; and Q represents the number of neighbor nodes having a level greater than or equal to the level of the receiving node, and the Q neighbor nodes are denoted as interference nodes;

a time for the receiving node to receive a data packet of a first sending node from the K neighbor nodes is expressed as:

$$T_{r\_1}=\theta+2T_{pd\_1}+\delta;$$

wherein $\delta$ represents a transmission delay of the data packet; and $T_{pd\_1}$ represents a propagation delay of the first sending node;

a guard time $T_{guard}$ is set between receiving operations of two data packets to ensure that the two data packets do not collide at the receiving node, and a time for receiving a data packet of a second sending node is expressed as:

$$T_{r\_2}=T_{r\_1}+T_{guard}+\delta;$$

a time for receiving a data packet of a third sending node is expressed as:

$$T_{r\_3}T_{r\_1}+2(T_{guard}+\delta);\text{ and}$$

a time for receiving a data packet of a $n^{th}$ sending node is expressed as:

$$T_{r\_n}=T_{r\_1}+(n+1)\times(T_{guard}+\delta),n\in 1,K$$

after receiving the ORDER frame from the receiving node, individual sending nodes calculate a respective sending time according to a receiving time;

a sending time of a first neighbor node is expressed as:

$$T_{s\_1}=T_{r\_1}-T_{pd\_1};$$

a sending time of a second neighbor node is expressed as:

$$T_{s\_2}=T_{r\_2}-T_{pd\_2};$$

a sending time of a $n^{th}$ neighbor node is expressed as:

$$T_{s\_n}=T_{r\_n}-T_{pd\_n}, n\in[1,K].$$

Compared to the prior art, the present disclosure has the following beneficial effects.

Compared with some existing reservation-based MAC (R-MAC) protocols, the method provided herein for implementing a concurrent transmission medium access control (MAC) protocol for underwater acoustic networks adopts a receiving node to set a timer and initiate the handshake. The receiving node broadcasts a control frame to perform handshakes with multiple nodes, and scheduling time is allocated for the data to be received subsequently according to the handshake situation, so as to allow the nodes that complete the handshake to send data in an orderly manner, enabling the concurrent transmission of multiple sending nodes to one receiving node. The present disclosure solves the problems of data collision, hidden terminal and space-time uncertainty to a great extent, and improves the node fairness, channel utilization rate and network throughput performance.

DETAILED DESCRIPTION OF EMBODIMENTS

Figure 1:
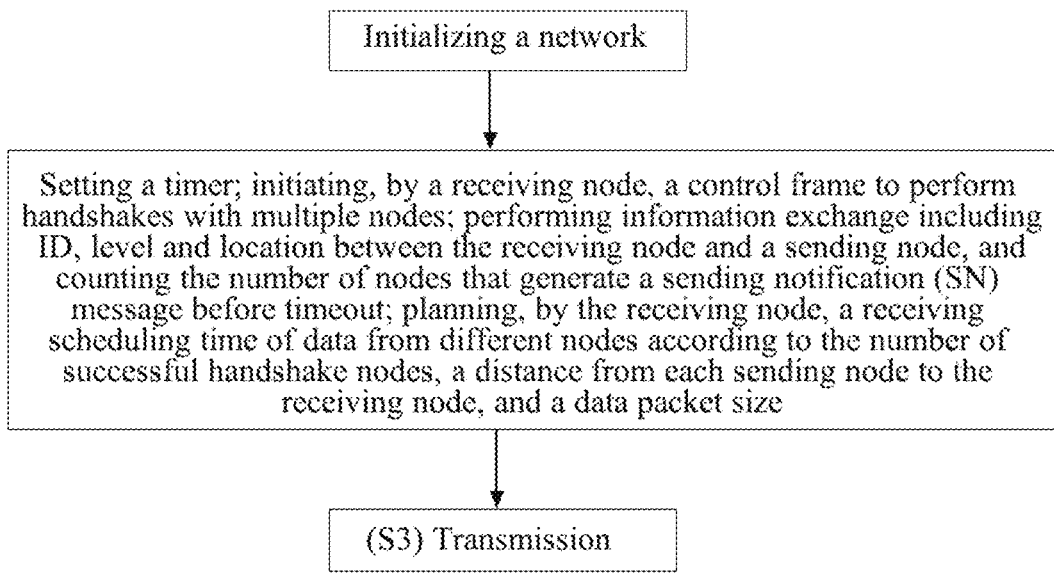
FIG. 1 is a flowchart of a method for implementing a many-to-one concurrent scheduling medium access control protocol (CS-MAC) for an underwater acoustic network according to Embodiment 1 of the present disclosure.

The technical solutions of the present disclosure will be described completely and clearly below with reference to the accompanying drawings and embodiments. Obviously, the embodiments provided below are merely illustrative, which are not intended to limit the disclosure.

Embodiment 1

Provided herein is a method for implementing a many-to-one concurrent scheduling medium access control (CS-MAC) protocol for underwater acoustic networks (UWANs), which is performed through the following steps.

(S1) A network is initialized. Node layering is performed such that a dynamic neighbor table is maintained for each node in the network. The dynamic neighbor table is configured to record ID, level, aging time and location information of a one-hop neighbor node.

The node layering is performed through the following steps.

A hello message is broadcast to the network by a sink node. Each node is allowed to obtain a corresponding level after receiving the hello message. The level of each node is configured according to the number of hops from the sink node. In a hierarchical network, a level of the sink node is 0. The less the number of hops from the sink node, the smaller the level of the sensor node, and vice versa.

(S2) A timer is set.

A control frame is initiated by a receiving node to perform handshakes with multiple nodes. Information exchange is performed between the receiving node and a sending node. The information exchange includes exchange of ID, level and location of the receiving node and the sending node. The number of nodes that generate a sending notification (SN) message before timeout is counted.

A receiving scheduling time of data from different nodes is planned by the receiving node according to the number of successful handshake nodes, a distance from the sending node to the receiving node, and a data packet size, so as to concurrently transmit multiple sending nodes to one receiving node, thereby improving a communication efficiency. At the same time, the CS-MAC protocol effectively avoids data collision between nodes, solves the problems of hidden terminals and space-time uncertainty, and reduces a data packet retransmission.

The step (S2) is performed as follows.

(S2.1) The timer is set and a ready-to-receive (RTR) message is broadcast. The timer is set to ensure that handshake control frames of all nodes that have data to be sent within a transmission range of the receiving node are received within a Timer period. The number of nodes that sent a response control frame to themselves before timeout.

The Timer period is calculated as:

$$\text{Timer} = 2T_{pd\_max} + 2\theta + \text{Rand}();$$

where Rand( ) represents a random time interval between 0-1; $\theta$ represents the transmission delay of the control frame; and $T_{pd\_max}$ represents a maximum propagation delay taken by a message from a sender to one of its neighbor node within the transmission range, calculated as follows:

$$T_{pd\_max} = d_{max}/v;$$

where $d_{max}$ is a maximum transmission range of the receiving node; and v is an underwater propagation speed of acoustic waves.

(S2.2) When a neighbor node receives the RTR message from the receiving node, a relationship between a level L_s of the neighbor node and a level L_r of the receiving node is determined. If L_r≥L_s, the neighbor node discards the RTR message and keeps silent; otherwise, the neighbor node performs channel sensing.

Whether an interference signal is detected is determined. If no interference signal is detected, the SN message containing an ID of a destination node, an ID, level, and location of the neighbor node is immediately sent to the receiving node; otherwise, the transmission of the SN message is delayed.

(S2.3) After receiving SN frames from different sending nodes in a handshake process, the receiving node allocates different receiving scheduling time respectively to each sending node that has data to send to the receiving node according to the number of sending nodes, a distance between the receiving node and each sending node, and a length of data of each sending node, and encapsulates the receiving scheduling time into an ORDER frame and broadcasts such that sending nodes that have completed the handshake process send data in an orderly manner, which ensures that no collision occurs in a process of receiving data.

(S3) After the ORDER frame is broadcast, the receiving node enters a data receiving stage. After receiving the ORDER frame, each sending node calculates a time point for data sending according to the receiving scheduling time allocated by the receiving node to the receiving node, and sends corresponding data to the receiving node at a calculated time point, and then waits for an acknowledgement (ACK) confirmation frame, so as to enable concurrently transmission of multiple sending nodes to one receiving node.

Figure 2:
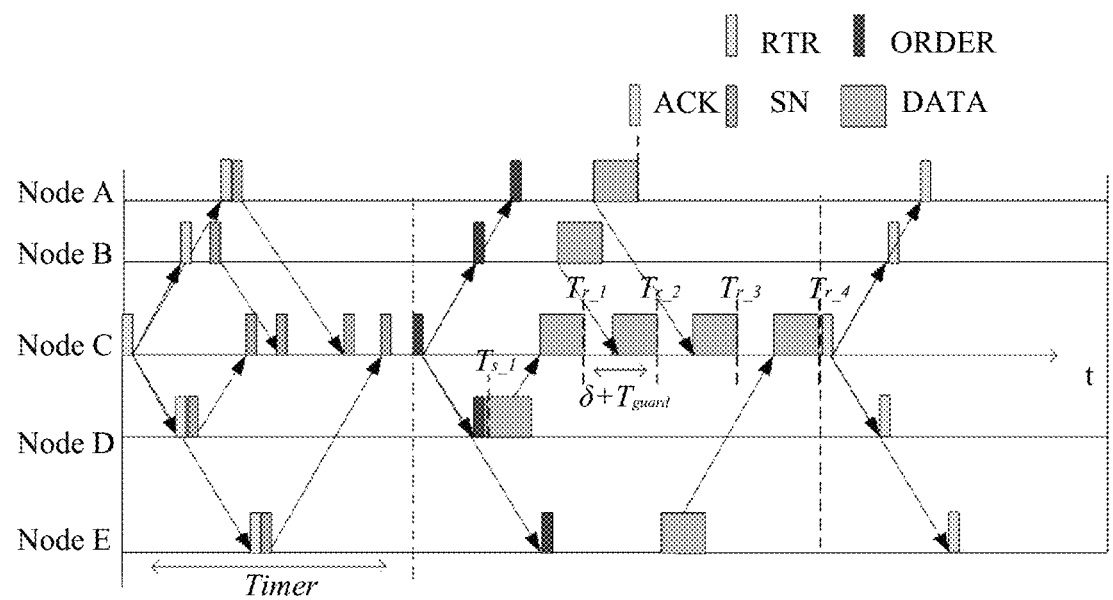
FIG. 2 schematically illustrates transmission of various types of messages through the CS-MAC protocol in Embodiment 1.

As shown in FIG. 2, after receiving sending notification (SN) messages from multiple different nodes, the receiving node C encapsulates the receiving scheduling time of the sending nodes A, B, E, and D into an ORDER message and broadcasts the ORDER message. The sending nodes A, B, E, and D calculate the time for sending their own data packets after receiving the ORDER message broadcast by the receiving node C, and send their own data packets to the receiving node C at the time point.

Suppose that the receiving node has H neighbor nodes, H=K+Q.

K represents the number of neighbor nodes having a level less than the level of the receiving node. Q represents the number of neighbor nodes having a level greater than or equal to the level of the receiving node, and the Q neighbor nodes are denoted as interference nodes.

A time for the receiving node to receive a data packet of a first sending node from the K neighbor nodes is expressed as:

$$T_{r\_1} = \theta + 2T_{pd\_1} + \delta;$$

where $\delta$ represents a transmission delay of the data packet; and $T_{pd\_1}$ represents a propagation delay of the first sending node.

A guard time $T_{guard}$ is set between receiving operations of two data packets to ensure that the two data packets do not collide at the receiving node, and a time for receiving a data packet of a second sending node is expressed as:

$$T_{r\_2} = T_{r\_1} + T_{guard} + \delta.$$

A time for receiving a data packet of a third sending node is expressed as:

$$T_{r\_3} = T_{r\_1} + 2(T_{guard} + \delta).$$

A time for receiving a data packet of a $n^{th}$ sending node is expressed as:

$$T_{r\_n} = T_{r\_1} + (n+1) \times (T_{guard} + \delta), n \in 1, K.$$

After receiving the ORDER frame from the receiving node, individual sending nodes calculate a respective sending time according to a receiving time.

A sending time of a first neighbor node is expressed as:

$$T_{s\_1} = T_{r\_1} - T_{pd\_1}.$$

A sending time of a second neighbor node is expressed as:

$$T_{s\_2} = T_{r\_2} - T_{pd\_2};$$

A sending time of a $n^{th}$ neighbor node is expressed as:

$$T_{s\_n} = T_{r\_n} - T_{pd\_n} \in [1, K].$$

Simulation and Analysis

The performance of the CS-MAC protocol provided in the present disclosure is evaluated by simulating the underwater environment based on the NS-3 simulation platform. The simulation environment is a multi-hop hierarchical underwater acoustic network composed of a sink node and multiple underwater sensor nodes. The sink node is deployed on the water surface in a static form, and other nodes are randomly and uniformly deployed in the underwater three-dimensional area. The simulation parameters are set as shown in Table 1.

TABLE 1

Simulation parameters

| Parameters | Value |
| --- | --- |
| Three-dimensional area | 1500m × 1500m × 2500m |
| ACK confirmation frame, | 56 bit |
| Bandwidth | 10 kbps |
| Node initial energy | 10000 J |
| Simulation time | 500 s |

Figure 3:
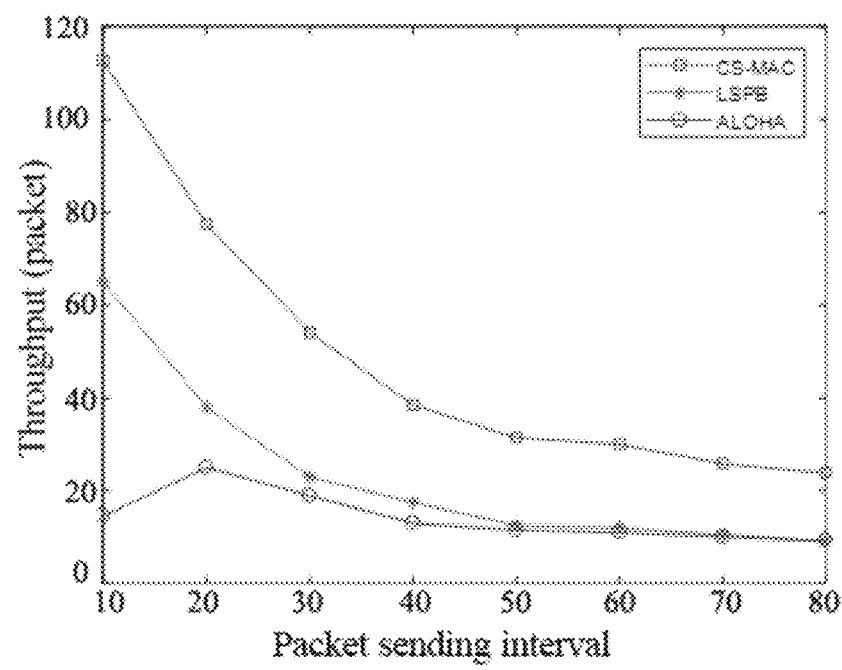
FIG. 3 schematically shows a relationship between a packet sending interval and network throughput in Embodiment 1.

In this embodiment, data delivery rate, end-to-end delay, throughput, and energy consumption are used to evaluate the performance of the CS-MAC protocol. FIG. 3 shows a comparison of the network throughput of ALOHA, LSPB-MAC and CS-MAC protocols under different data packet sending intervals. The number of nodes is set to 30; a data packet size is set to 134 bytes; the data packet sending interval is set to 10 s, 20 s, 30 s, 40 s, 50 s, 60 s, 70 s and 80 s, and other parameters are shown in Table 1. It can be seen from the FIG. 3 that the network throughput of CS-MAC protocol is higher than that of ALOHA protocol and LSPB-MAC protocol under different data packet sending intervals.

Figure 4:
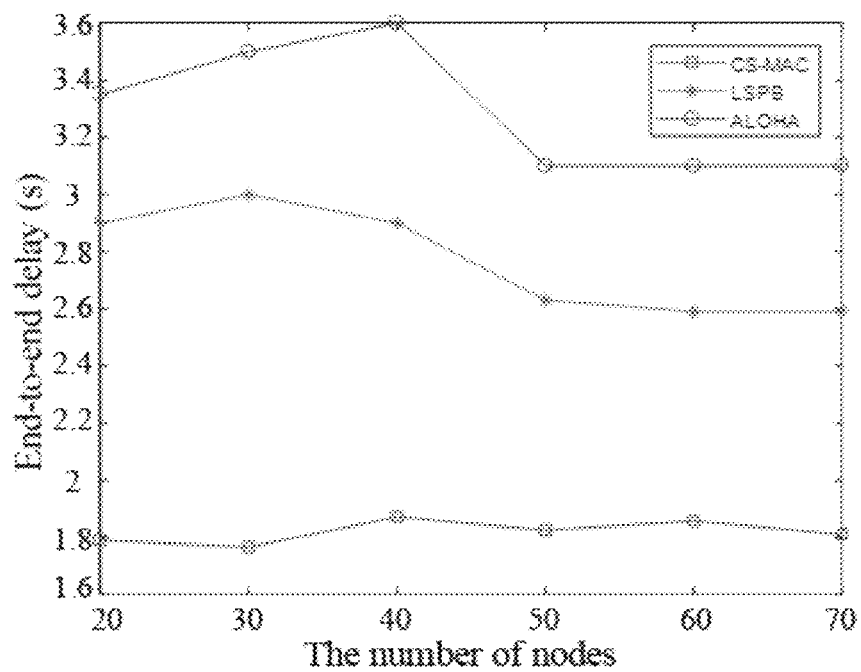
FIG. 4 schematically shows a relationship between the number of nodes and an end-to-end delay in Embodiment 1.

FIG. 4 shows a comparison of the end-to-end delay of ALOHA, LSPB-MAC and CS-MAC protocols under different numbers of nodes. The number of nodes is set to 20, 30, 40, 50, 60, and 70; the data packet size is set to 134 bytes; and other parameters are shown in Table 1. It can be seen from the FIG. 4 that the end-to-end delay of the CS-MAC protocol fluctuates in a range of 1.79-1.90 s when the number of nodes is different. Compared with the ALOHA and LSPB-MAC protocols, the end-to-end delay of the CS-MAC protocol is lower.

Figure 5:
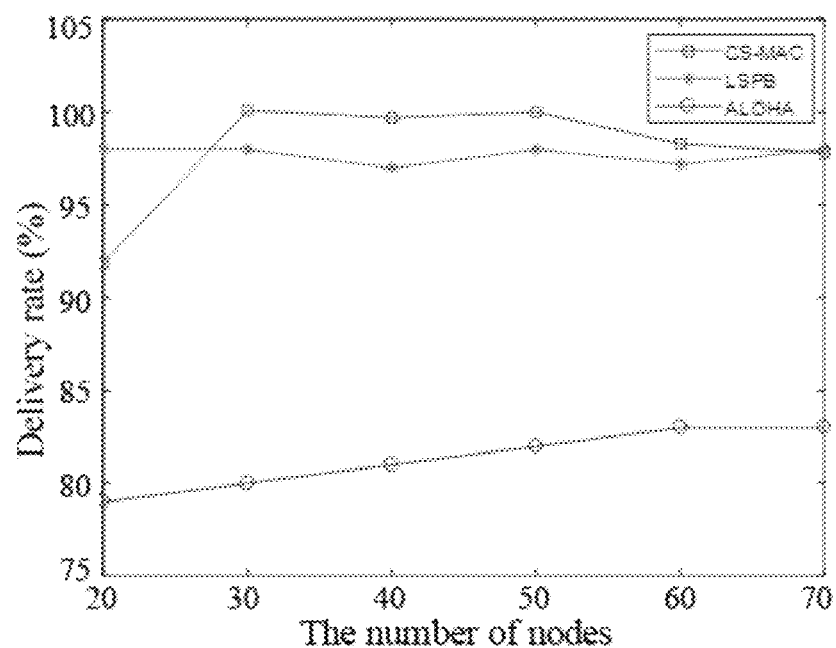
FIG. 5 schematically shows a relationship between the number of nodes and a delivery rate in Embodiment 1.

FIG. 5 shows a comparison of the delivery rates of ALOHA, LSPB-MAC and CS-MAC protocols under different numbers of nodes. The number of nodes is set to 20, 30, 40, 50, 60, and 70; the data packet size is set to 134 bytes; and other parameters are shown in Table 1. It can be seen from the FIG. 5 that when the number of nodes is 20, the delivery rate of the CS-MAC protocol is lower than that of the LSPB-MAC protocol while higher than that of the ALOHA protocol; when the number of nodes is 30-60, the delivery rate of the CS-MAC protocol is higher than that of the ALOHA and LSPB-MAC protocols; when the number of nodes is 70, the delivery rate of the CS-MAC protocol tends to be the same as that of the LSPB-MAC protocol.

Figure 6:
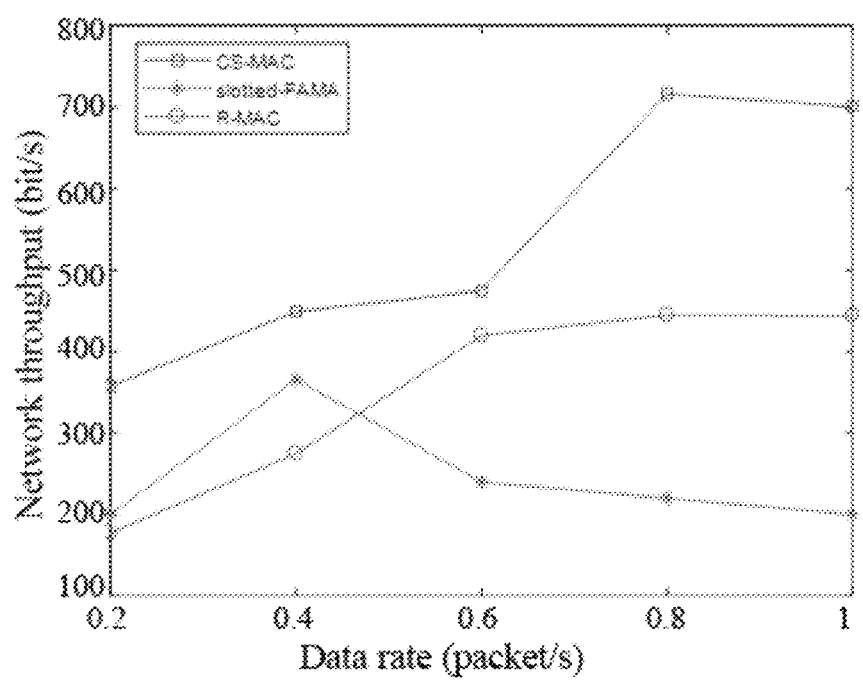
FIG. 6 schematically shows a relationship between a data rate and the network throughput in Embodiment 1.

FIG. 6 shows a comparison of the network throughput of reservation-based MAC (R-MAC), slotted floor acquisition multiple access (Slotted-FAMA) and CS-MAC protocols under different data rates. The number of nodes is set to 35, the data packet size is set to 200 bytes, and other parameters are shown in Table 1. It can be seen from the FIG. 6 that the overall network throughput of CS-MAC protocol is higher than that of R-MAC protocol and slotted-FAMA protocol at different data rates.

Figure 7:
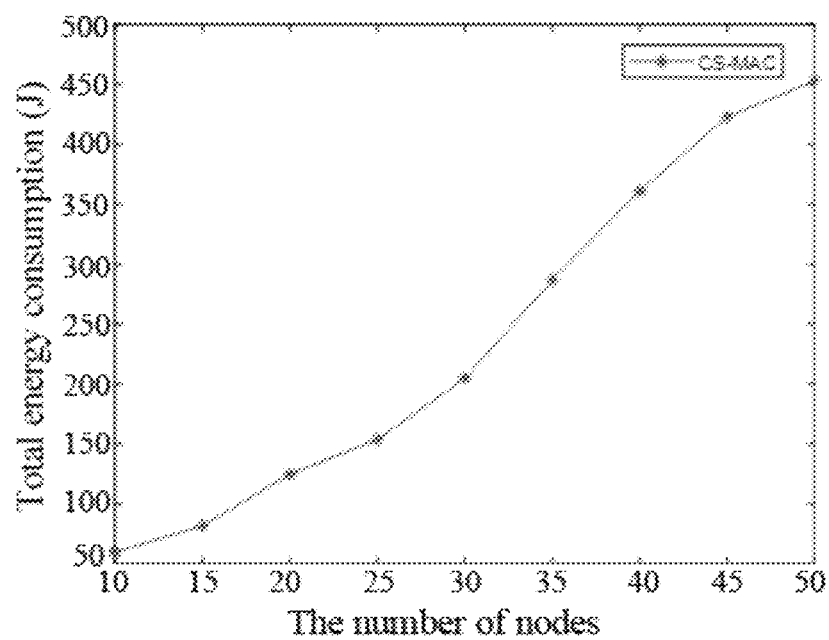
FIG. 7 schematically shows a relationship between the number of nodes and a total energy consumption of the underwater acoustic network in Embodiment 1.

FIG. 7 shows an effect of the number of nodes on the total energy consumption. Under the condition that the parameters such as the data packet sending interval and data volume are consistent, the total energy consumption of the network is evaluated by setting the number of different nodes and the strength of the acoustic signal. It can be seen from the FIG. 7, the total energy consumption of the network increases with the increase of the number of nodes.

This embodiment proposes a CS-MAC protocol suitable for the underwater acoustic network according to the characteristics and existing challenges of the underwater acoustic networks. In the CS-MAC protocol, the receiving node can shake hands with multiple sending nodes by broadcasting a RTR control frame to exchange a location and level information of the sending nodes and the receiving nodes and the scheduling time for receiving the data through the control frame, so as to concurrently transmit multiple sending nodes to one receiving node, and solve the problems of hidden terminal and space-time uncertainty. Simulation experiments show that the network throughput of CS-MAC protocol is better than that of ALOHA, R-MAC, slotted-FAMA and LSPB-MAC protocols; the data packet delivery rate of CS-MAC protocol is higher than that of ALOHA and LSPB-MAC protocols; and the end-to-end delay of the CS-MAC protocol is lower than that of the ALOHA and LSPB-MAC protocols.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A method for implementing a many-to-one concurrent transmission medium access control (MAC) protocol for underwater acoustic networks (UWANs), comprising:
   (S1) initializing a network;
   (S2) performing a handshake process through steps of:
   (S2.1) setting a timer and broadcasting a ready-to-receive (RTR) message; wherein the timer is set to ensure that handshake control frames of all nodes that have data to be sent within a transmission range of a receiving node are received within a Timer period; and counting the number of nodes that send a response control frame to themselves before the timer times out;
   (S2.2) receiving, by a neighbor node, the RTR message from the receiving node;
   determining a relationship between a level L_s of the neighbor node and a level L_r of the receiving node; and
   determining whether an interference signal is detected;
   (S2.3) receiving, by the receiving node, sending notification (SN) frames from different sending nodes in the handshake process;
   allocating, by the receiving node, a receiving scheduling time respectively to each sending node that has data to send to the receiving node according to the number of sending nodes, a distance between the receiving node and each sending node, and a length of data of each sending node; and
   encapsulating the receiving scheduling time into an ORDER frame followed by broadcasting such that sending nodes that have completed the handshake process send data in an orderly manner; and
   (S3) performing a data transmission according to a planned time through steps of:
   after the ORDER frame is broadcasted, the receiving node enters a data receiving stage; and after receiving the ORDER frame, each sending node calculates a time point for data sending according to the receiving scheduling time allocated by the receiving node to the receiving node, and sends corresponding data to the receiving node at a calculated time point, and then waits for an acknowledgement (ACK) confirmation frame, so as to enable concurrent transmission of multiple sending nodes to one receiving node;

the receiving node has H neighbor nodes, H=K+Q;

wherein K represents the number of neighbor nodes having a level less than the level of the receiving node; and Q represents the number of neighbor nodes having a level greater than or equal to the level of the receiving node, and the Q neighbor nodes are denoted as interference nodes;

a time for the receiving node to receive a data packet of a first sending node from the K neighbor nodes is expressed as:

$$T_{r\_1} = \theta + 2T_{pd\_1} + \delta;$$

wherein $\delta$ represents a transmission delay of the data packet; and $T_{pd\_1}$ represents a propagation delay of the first sending node;

a guard time $T_{guard}$ is set between receiving operations of two data packets to ensure that the two data packets do not collide at the receiving node, and a time for receiving a data packet of a second sending node is expressed as:

$$T_{r\_2} = T_{r\_1} + T_{guard} + \delta;$$

a time for receiving a data packet of a third sending node is expressed as:

$$T_{r\_3} = T_{r\_1} + 2(T_{guard} + \delta); \text{ and}$$

a time for receiving a data packet of a $n^{th}$ sending node is expressed as:

$$T_{r\_n} = T_{r\_1} + (n+1) \times (T_{guard} + \delta), n \in [1, K];$$

after receiving the ORDER frame from the receiving node, individual sending nodes calculate a respective sending time according to a receiving time;

a sending time of a first neighbor node is expressed as:

$$T_{s\_1} = T_{r\_1} - T_{pd\_1};$$

a sending time of a second neighbor node is expressed as:

$$T_{s\_2} = T_{r\_2} - T_{pd\_2}; \text{ and}$$

a sending time of a $n^{th}$ neighbor node is expressed as:

$$T_{s\_n} = T_{r\_n} - T_{pd\_n}, n \in [1, K].$$

2. The method of claim 1, wherein the step (S1) comprises:

performing node layering such that a dynamic neighbor table is maintained for each node in the network, wherein the dynamic neighbor table is configured to record ID, level, aging time and location information of a one-hop neighbor node.

3. The method of claim 2, wherein the node layering is performed through steps of:

broadcasting, by a sink node, a hello message to the network;

allowing each node to obtain a corresponding level after receiving the hello message; and configuring the level of each node according to the number of hops from the sink node.

4. The method of claim 1, wherein the Timer period is calculated as:

$$\text{Timer} = 2T_{pd\_max} + 2\theta + \text{Rand}(\ );$$

wherein Rand( ) represents a random time interval between 0-1; $\theta$ represents a transmission delay of the control frame; and $T_{pd\_max}$ represents a maximum propagation delay taken by a message from a sender to one of its neighbor nodes within a transmission range, calculated as follows:

$$T_{pd\_max} = d_{max}/v;$$

wherein $d_{max}$ represents a maximum transmission range of the receiving node; and $v$ is an underwater propagation speed of acoustic waves.

5. The method of claim 4, wherein in step (S2.2), if $L\_r \geq L\_s$, the neighbor node discards the RTR message and keeps silent; otherwise, the neighbor node performs channel sensing.

6. The method of claim 5, wherein in step (S2.2), if no interference signal is detected, the SN message containing an ID of a destination node, an ID, level, and location of a node is immediately sent to the receiving node;

otherwise, transmission of the SN message is delayed.

* * * * *